July 17, 1923.                                                1,462,204
F. TOBIS ET AL
AUTO REAR AXLE DIFFERENTIAL MECHANISM
Filed Jan. 23, 1922                     4 Sheets-Sheet 2
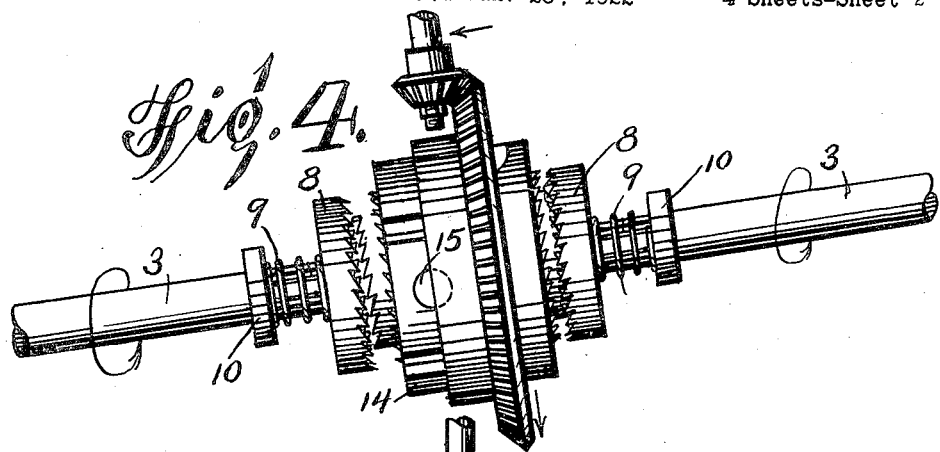
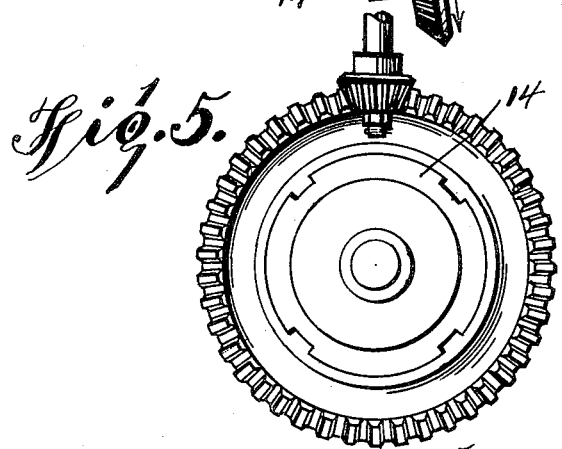
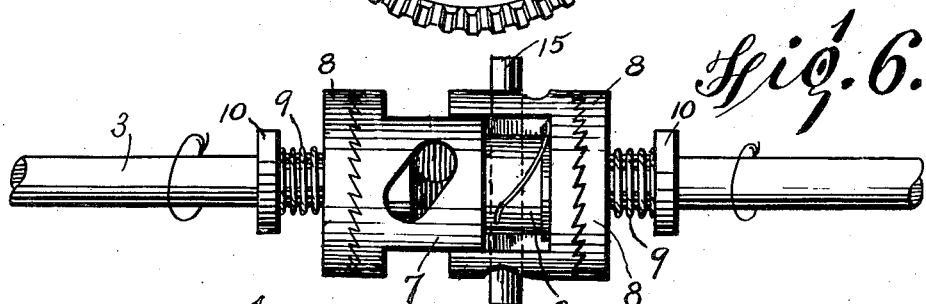
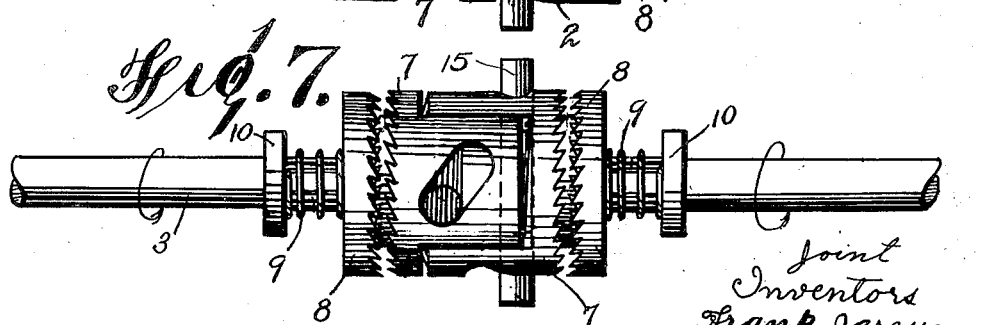
Joint Inventors
Frank Jarzyna
and
Frank Tobis

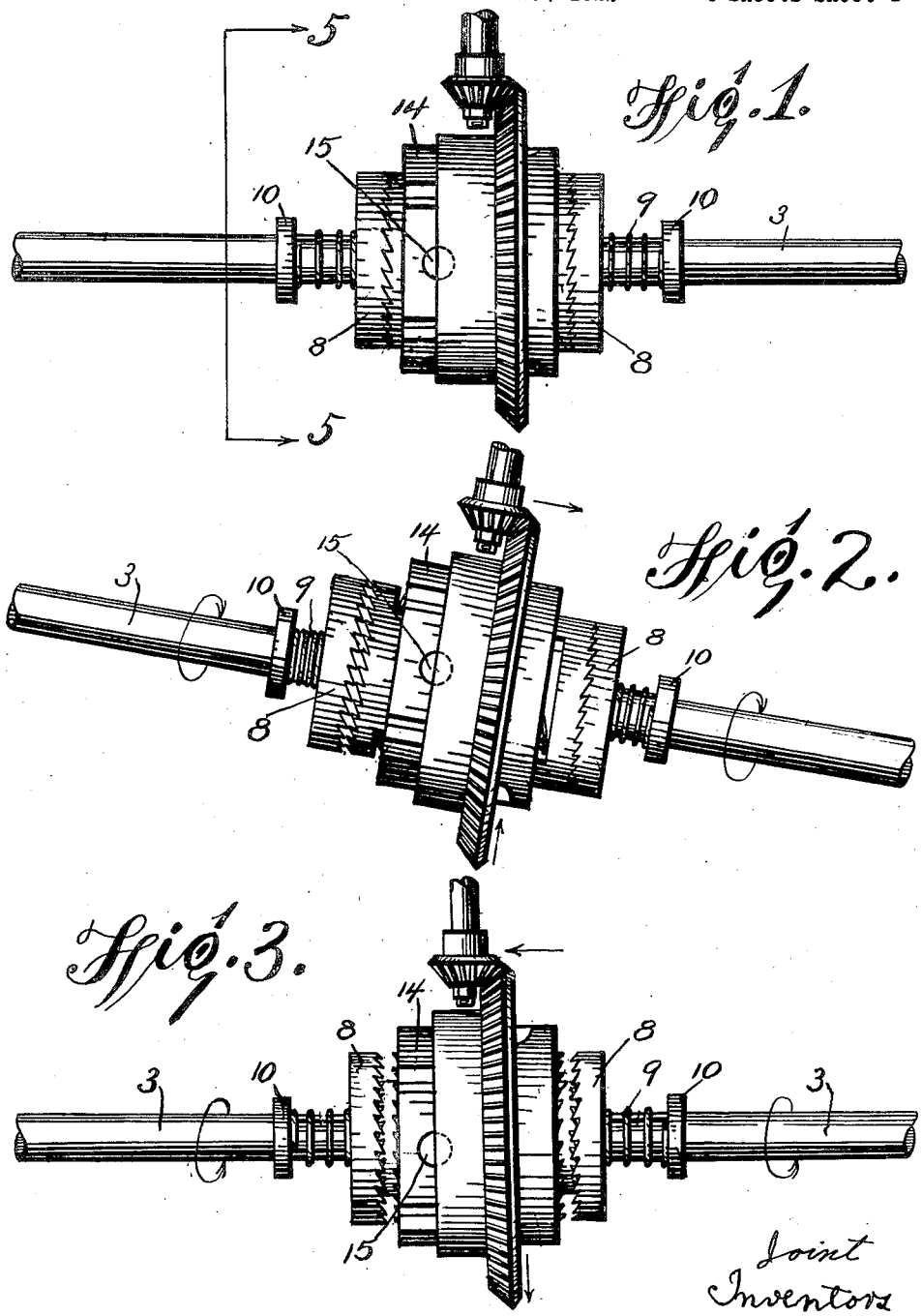

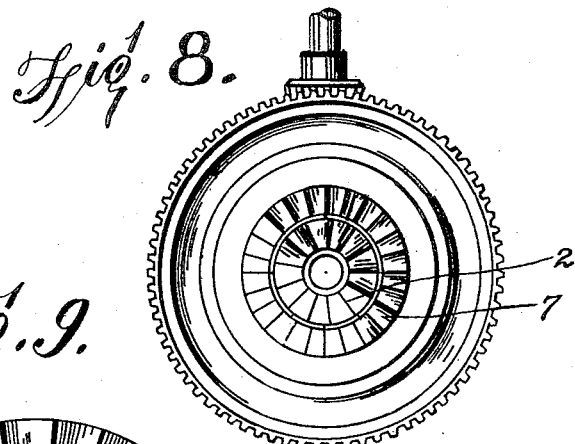
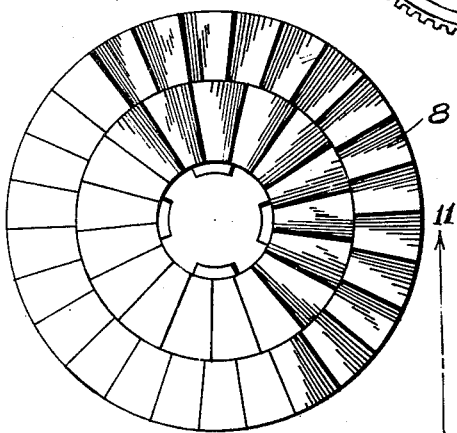
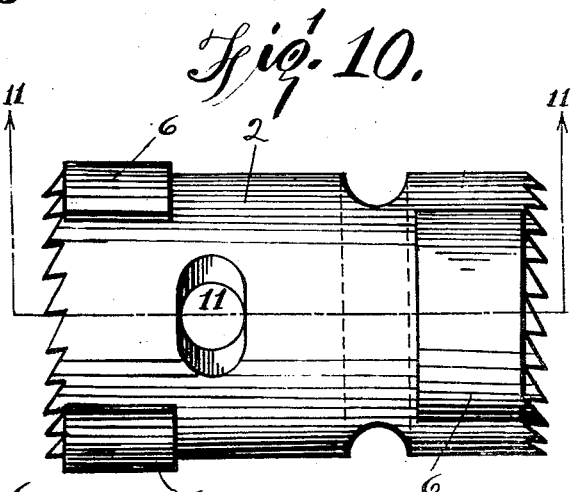
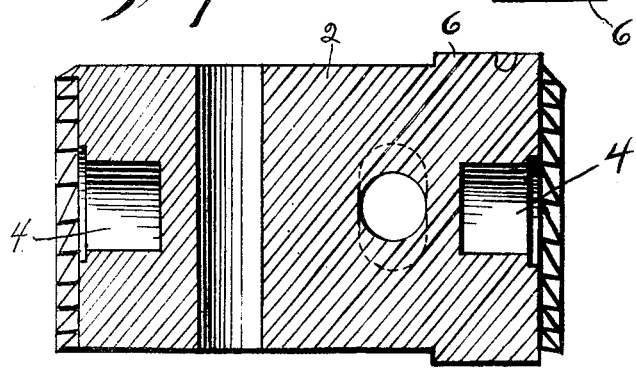

July 17, 1923.
F. TOBIS ET AL
1,462,204
AUTO REAR AXLE DIFFERENTIAL MECHANISM
Filed Jan. 23, 1922  4 Sheets-Sheet 4
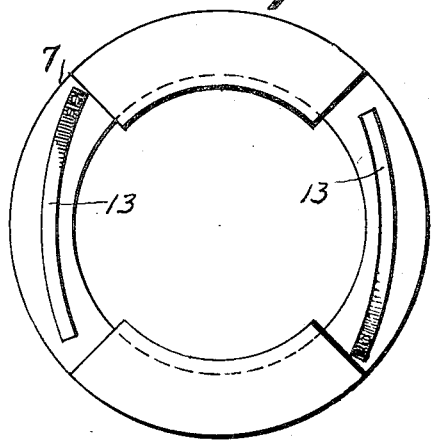
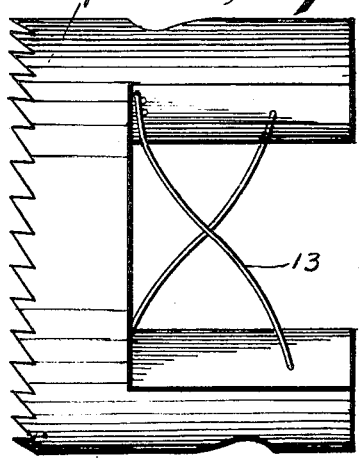
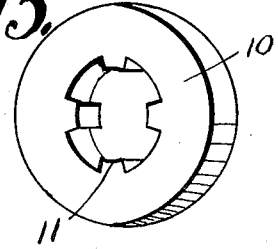
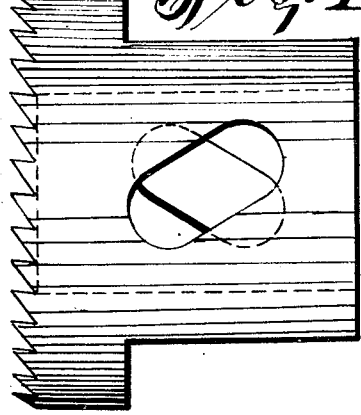
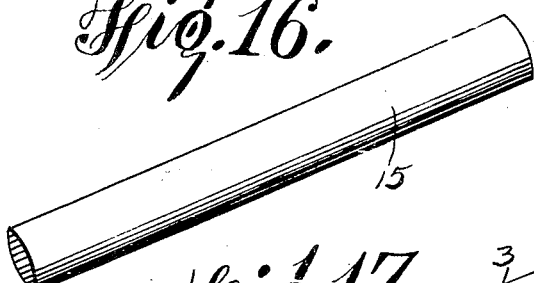
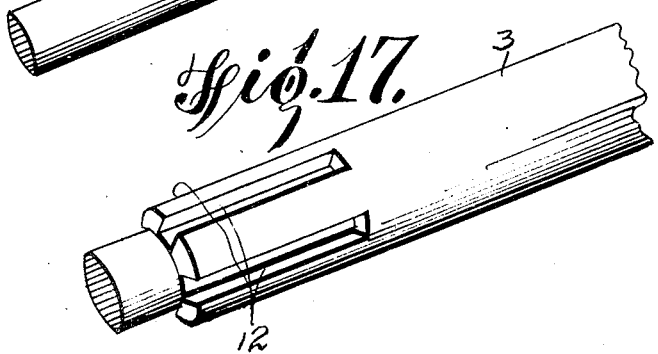
Joint Inventors
Frank Jarzyna
and
Frank Tobis Patented July 17, 1923.

1,462,204

UNITED STATES PATENT OFFICE.

FRANK TOBIS AND FRANK JARZYNA, OF CHICAGO, ILLINOIS.

AUTO REAR-AXLE DIFFERENTIAL MECHANISM.

Application filed January 23, 1922. Serial No. 531,296.

*To all whom it may concern:*

Be it known that we, FRANK TOBIS and FRANK JARZYNA, citizens of Poland, residing at Chicago, in the county of Cook and State of Illinois, have invented certain new and useful Improvements in Auto Rear-Axle Differential Mechanism, of which the following is a specification.

Our invention relates to differential transmission mechanism for motor vehicles, and our object is to produce an improved mechanism of this character which will be of simple and durable construction and which will perform its functions efficiently and reliably. More particular objects and advantages of the invention will become apparent as this description proceeds.

Referring to the accompanying drawings for a specific description of a mechanism embodying our invention:—

Fig. 1 is a plan view showing the rear end of a motor vehicle propeller shaft, the divided axle and the interposed differential mechanism which embodies our improvements, the parts being shown in the-position assumed when the drive is straight ahead.

Fig. 2 is a similar view showing the device when the vehicle is making a right hand turn ahead.

Fig. 3 is a similar view showing the position of the parts when the vehicle is being driven straight backwards.

Fig. 4 is a similar view showing the mechanism making a reverse movement to the right.

Fig. 5 is a section on line 5—5 of Fig. 1.

Fig. 6 is an elevation of the differential mechanism operating forwardly, the ring gear being removed.

Fig. 7 is a similar view with the mechanism operating reversely.

Fig. 8 is an end view of the inner clutch members which are surrounded by the master gear of the differential.

Fig. 9 is a face view of one of the pair of clutch members splined on the divided axle.

Fig. 10 is an elevation of a clutch member.

Fig. 11 is a section on line 11—11 of Fig. 10.

Fig. 12 is a rear elevation of a clutch member.

Fig. 13 is a side elevation thereof.

Fig. 14 is a view taken at right angles to Fig. 13.

Figs. 15, 16 and 17 are detail views.

In the differential mechanism embodying our present improvements, an inner cylindrical member 2 is rotatably supported on the ends of axle sections 3 by means of sockets formed in the ends of member 2 receiving the cylindrical ends of the axle sections. Member 2 is provided on each of its ends with a pair of enlargements 6 and supports a pair of clutch members 7. Clutch members 7 have the construction illustrated by Figs. 12, 13 and 14, and it will be seen by reference to these figures that each clutch member consists of an outer annular portion provided with axially directed ratchet teeth and a pair of inner cylindrical extensions which are fitted to member 2 between the enlargements 6 thereof. Clutch members 7, therefore, are mounted for axial movement with respect to the member 2, but are restrained from relative rotary movements. The ends of member 2 are provided with axially directed ratchet teeth which are inclined oppositely to the adjacent ratchet teeth on clutch member 7. Splined on axle sections 3 are clutch members 8, each of which is provided with inner and outer oppositely directed ratchet teeth which are adapted to engage the teeth on member 2 and the teeth on the respective clutch member 7. Clutch members 8 are urged inwardly by springs 9 which surround the axle sections and bear at their inner ends against the clutch members 8 and at their outer ends against washers 10. The washers 10, as shown by Fig. 15 are provided with teeth 11 adapted to engage the spline grooves 12 on said axle sections. Clutch members 7 are urged outwardly, or to projected positions with respect to member 2, by means of springs 13, which are fixed at one end to a clutch member and bear at their free ends against the inward projections of the other member. Surrounding clutch members 7 is a cylindrical member 14 which is fixed against rotative movement with respect to the large bevel gear of the differential by any approved means. The means shown for this purpose consists of longitudinal grooves in the cylindrical member and corresponding teeth in the hub of the bevel gear engaging said grooves. Clutch members 7 are adapted to be automatically projected and retracted by means of pins 15 which pass through diametrical holes in the member 2 and engage cam slots in clutch members 7 and have their ends anchored in holes or sockets formed in cylindrical member 14. It will be observed from Fig. 10 that the diametrical holes in member 2 are flared in a transverse plane from a central point, whereby the pins are permitted a limited transverse rotary movement with respect to member 2 about the axis thereof.

The operation of the differential mechanism described is briefly as follows: When the large bevel gear is rotated in a direction to drive the car forward, the pins 15, by reason of their connection with the cylindrical member 14, are rotated transversely with respect to member 2, and coacting with the cam slots in clutch members 7 project said members, whereby the ratchet teeth on the ends thereof engage the outer ratchet teeth on members 8 clutching the axle sections to the large bevel gear for forward drive. Fig. 6 shows the positions now assumed by the parts. It will be noted that when the parts occupy this position either axle section may move at a greater angular velocity than the other, the clutch member 8 on the faster moving section ratcheting over its coacting clutch member 7. On the other hand, when the large bevel gear is rotated in a direction to drive the car backwards, the pins 15 rotate transversely in the flaring holes of member 2 to the opposite limit of their transverse movement. In their relative rotation with respect to member 2 they coact with the cam slots in clutch members 7 and thereby retract said members against the action of springs 13, to the position shown in Fig. 7. In this position, the teeth on members 7 are inward of the teeth on member 2, whereby these latter teeth are permitted to engage the inner teeth on clutch members 8. The parts now have the positions shown in Figs. 3, 4 and 7, and the axle sections are clutched to the large bevel gear for backing. It will be observed that in this position also either axle may rotate faster than the other.

Now having particularly described one embodiment of our invention, what we claim as new and desire to secure by Letters Patent of the United States is:

1. A differential transmission gear for motor vehicles comprising, in combination, a divided axle, two coaxially arranged clutch members rotatably mounted on the inner ends of said axle, said clutch members each having ratchet teeth projecting from the outer ends thereof and the teeth of one member being reversely arranged with respect to those of the other member, one of said members consisting of two separate elements each carrying a set of ratchet teeth adapted to be projected beyond the teeth of the other member and to be retracted inwardly thereof, two clutch members slidably but non-rotatably mounted adjacent the ends of said axle, each having two concentric sets of ratchet teeth reversely arranged with respect to each other and adapted to engage the teeth of said first mentioned members, springs tending to force said second mentioned clutch members inwardly, and means for rotating said coaxially arranged clutch members and for projecting and retracting said elements according to the direction of rotation.

2. A differential transmission gear for motor vehicles comprising in combination with the propeller shaft and divided axle, two concentrically arranged ratchet-clutch members rotatably mounted on the inner ends of said axle, said clutch members each having ratchet teeth projecting from the outer ends thereof and the teeth of one member being reversed with respect to those of the other member, one of said members consisting of two separate elements each carrying a set of ratchet teeth adapted to be projected beyond the teeth of the other member and to be retracted inwardly thereof, two ratchet-clutch members splined on said axle, each having two concentric sets of ratchet teeth reversely arranged with respect to each other and adapted to engage the teeth on said first mentioned members, springs tending to force said second mentioned clutch members inwardly, an annular member surrounding said mechanism and having a gear rigid therewith meshing with a gear on said propeller shaft, and connections between said annular member and said first mentioned clutch members adapted to project and retract said separate elements according to the direction of rotation of said gears and to lock said first mentioned clutch members for rotation with said annular member.

3. A differential transmission gear comprising, in combination, a divided axle, a ratchet-clutch member journaled on the inner ends of said axle and having an annular set of ratchet teeth projecting from each end thereof, a pair of ratchet-clutch members slidably mounted on said member, each having a set of ratchet teeth projecting from the outer end thereof reversely arranged with respect to the teeth on said member, a second pair of ratchet clutch members splined on said axle, each having two concentric sets of ratchet teeth adapted to engage the teeth on said ratchet member and said pair of ratchet members, spring means tending to force the members of said second pair inwardly, an annular member surrounding said mechanism, said ratchet-clutch member being connected to said annular member for rotation thereby, and cam mechanism for moving the members of said first mentioned pair outwardly or inwardly according to the direction of rotation of said annular member and locking said members for rotation with said annular member.

4. A differential transmission gear for motor vehicles comprising, in combination, a divided axle, a cylindrical clutch member journaled on the inner ends of said axle having ratchet teeth projecting from each end thereof, a pair of clutch members slidably but non-rotatably mounted on said member, each having ratchet teeth projecting from the outer end thereof reversed with respect to the teeth on said member, a second pair of clutch members splined on said axle each having two concentric sets of ratchet teeth adapted to engage the teeth on said ratchet member and on said pair of ratchet members respectively, springs tending to force said second pair of clutch members inwardly, an annular member surrounding said mechanism and having a gear wheel rigid therewith, said clutch member being connected to said annular member for rotation thereby, and cam means between said annular member and said first mentioned pair of clutch members operative to move the members of said pair outwardly or inwardly according to the direction of rotation of said annular member and to lock said members for rotation with said annular member.

5. A differential transmission gear for motor vehicles comprising, in combination with the propeller shaft and the divided axle, a clutch member journaled on the inner ends of said axle having ratchet teeth projecting from each end thereof, a pair of clutch members slidably but non-rotatably mounted on said member each having ratchet teeth projecting from the outer end thereof and facing reversely with respect to the teeth on said member, two clutch members splined on said divided axle adjacent the inner ends thereof each having two concentric sets of ratchet teeth reversely arranged with respect to each other and adapted to engage the teeth on said clutch member and said pair of clutch members respectively, coiled springs surrounding said shaft and bearing at their outer ends against abutments thereon and at their inner ends against said two clutch members, springs between said pair of clutch members tending to project said members outwardly, said pair of clutch members each having a pair of diametrically located oppositely inclined slots, pins passing through said slots and through said ratchet member, an annular member surrounding said mechanism and having the ends of said pins anchored therein, a bevel gear rigid with said annular member, and a bevel pinion on said propeller shaft meshing with said bevel gear.

In testimony whereof we hereunto affix our signatures.

FRANK TOBIS.
FRANK JARZYNA.